(12) United States Patent
Freeman et al.

(10) Patent No.: US 11,693,649 B2
(45) Date of Patent: Jul. 4, 2023

(54) AUTONOMOUS KUBERNETES OPERATOR CREATION AND MANAGEMENT

(71) Applicant: International Business Machines Corporation, Armonk, NY (US)

(72) Inventors: Latrell D. Freeman, Holly Springs, NC (US); Ivan Dovgan, Clintondale, NY (US); Al Chakra, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 17/223,302

(22) Filed: Apr. 6, 2021

(65) Prior Publication Data
US 2022/0318001 A1   Oct. 6, 2022

(51) Int. Cl.
*G06F 8/70* (2018.01)
*G06F 8/30* (2018.01)
*G06F 8/60* (2018.01)
*H04L 67/10* (2022.01)

(52) U.S. Cl.
CPC ............. *G06F 8/70* (2013.01); *G06F 8/30* (2013.01); *G06F 8/60* (2013.01); *H04L 67/10* (2013.01)

(58) Field of Classification Search
CPC ......... G06F 8/30; G06F 8/60–70; H04L 67/10
USPC .................................................. 717/107–127
See application file for complete search history.

(56) References Cited

U.S. PATENT DOCUMENTS

| | | | |
|---|---|---|---|
| 3,838,400 A | 9/1974 | Carpentier et al. | |
| 9,047,160 B2 * | 6/2015 | Adi | G06F 8/63 |
| 10,354,093 B1 * | 7/2019 | Farber | G06F 21/6218 |
| 10,873,592 B1 * | 12/2020 | Singh | H04L 63/1416 |
| 10,908,999 B2 * | 2/2021 | Natanzon | G06F 11/1484 |
| 11,271,895 B1 * | 3/2022 | Vallala | H04L 41/0803 |
| 11,334,334 B2 * | 5/2022 | Rosenzwig | G06F 8/71 |
| 11,347,684 B2 * | 5/2022 | Alluboyina | G06F 11/1446 |
| 11,442,765 B1 * | 9/2022 | Zhang | G06F 9/30145 |
| 11,550,903 B1 * | 1/2023 | Epstein | G06F 21/577 |
| 11,593,223 B1 * | 2/2023 | Mehta | G06F 11/1461 |
| 2007/0001404 A1 | 1/2007 | Nylander-Hill et al. | |
| 2021/0103554 A1 * | 4/2021 | Alluboyina | G06F 3/065 |
| 2021/0149769 A1 * | 5/2021 | Balcha | G06F 11/1469 |

FOREIGN PATENT DOCUMENTS

| | | |
|---|---|---|
| CN | 110166278 A | 8/2019 |
| CN | 110569109 A | 12/2019 |
| CN | 110768833 A | 2/2020 |

(Continued)

OTHER PUBLICATIONS

Mahajan et al, "Suture: Stitching Safety onto Kubernetes Operators", ACM, pp. 19-20 (Year: 2020).*

(Continued)

*Primary Examiner* — Anil Khatri
(74) *Attorney, Agent, or Firm* — Cantor Colburn LLP; Teddi Maranzano

(57) ABSTRACT

A computer-implemented method includes dynamically generating a sub-operator bundle based on a template. The method further includes converting, by a processing device using a sub-operator registry server, the sub-operator bundle into a sub-operator. The method further includes providing, by the processing device using the sub-operator registry server, the sub-operator to a catalog.

17 Claims, 18 Drawing Sheets

(56) References Cited

FOREIGN PATENT DOCUMENTS

| CN | 111522628 A | 8/2020 |
|---|---|---|
| CN | 111552494 A | 8/2020 |
| CN | 111813419 A | 10/2020 |
| CN | 111966455 A | 11/2020 |
| CN | 112000439 A | 11/2020 |
| CN | 112000441 A | 11/2020 |

OTHER PUBLICATIONS

Beltre et al, "Enabling HPC workloads on Cloud Infrastructure using Kubernetes Container Orchestration Mechanisms", IEEE, pp. 11-20 (Year: 2019).*
Kanso et al, "Designing a Kubernetes Operator for Machine Learning Applications", ACM, pp. 7-12 (Year: 2021).*
Zanibbi et al, "Recognizing Mathematical Expressions Using Tree Transformation", IEEE, pp. 1455-1467 (Year: 2002).*
Huang et al, "Design and Implementation of an Edge Computing Platform Architecture Using Docker and Kubernetes for Machine Learning", ACM, pp. 29-32 (Year: 2019).*
Takahashi et al, "A Portable Load Balancer for Kubernetes Cluster", ACM, pp. 1-10 (Year: 2018).*
Chazapis et al, "A Unified Storage Layer for Supporting Distributed Workflows in Kubernetes", ACM, pp. 1-19 (Year: 2021).*
Balla et al, "Adaptive scaling of Kubernetes pods", IEEE, pp. 1-5 (Year: 2020).*
International Search Report and Written Opinion Issued in International Application No. PCT/EP2022/053025 dated Jun. 9, 2022; 11 Pages.

\* cited by examiner

400

Software Services

| Overview | Templates | Instances |

Software Services Templates

Actions ▾   Add Template ▾

12 of 43 items shown.  Clear filter

| | Template Name<br>Filter | Version<br>Filter | State<br>Filter active |
|---|---|---|---|
| ☐ | ⊕ Db2AndWLp | 2 | ☐ Archived |
| ☐ | ⊕ CICSAndWLP | 1 | ▭ Draft |
| ☐ | ⊕ Db2AndWLp | 1 | ▦ Published |
| ☐ | CICS_S4 | 6 | ▦ Published |
| ☐ | Db2SchemaProLike | 2 | ▦ Published |
| ☐ | WLPTemplate | 6 | ▦ Published |

```
apiVersion: operators.coreos.com/v1alpha1
kind: ClusterServiceVersion
metadata:
  annotations:
    alm-examples: |-
      [
        {
          "apiVersion": "templates.zoscb.ibm.com/v1alpha1",
          "kind": "Db2schemaservice",
          "metadata": {
            "name": "db2schemaservice"
          },
          "spec": {
            "template_type": "standard",
            "input_variables": [
              {
                "name": "QMDB",
                "value": "KRDBQM"
              },
              {
                "name": "QMSCHEMA",
                "value": "KRUSERQM"
              },
              {
                "name": "objnames",
                "value": ""
              },
              {
                "name": "listdef",
                "value": ""
              }
            ]
          }
        }
      ]
  capabilities: Basic Install
  categories: Integration & Delivery
  name: db2schemaservice-operator.v1.3.0-20201104.125425
  namespace: placeholder
spec:
  apiservicedefinitions: {}
  customresourcedefinitions:
    owned:
    - description:
      displayName: DB2 for z/OS
      kind: Db2schemaservice
      name: db2schemaservices.templates.zoscb.ibm.com
      specDescriptors:
```

```
apiVersion: v1
data:
  clusterServiceVersions: |
    apiVersion: operators.coreos.com/v1alpha1
    kind: ClusterServiceVersion
    metadata:
      annotations:
        alm-examples: |-
          [
            {
              "apiVersion": "templates.zoscb.ibm.com/v1alpha1",
              "kind": "Zosmiddlewared",
              "metadata": {
                "name": "zos-middleware-d"
              },
              "spec": {
                "key1": "val1",
                "key2": "val2"
              }
            }
          ]
        capabilities: Basic Install
        categories: Integration & Delivery
        name: zos-middleware-d-operator.v1.3.1
        namespace: placeholder
        labels:
          operatorframework.io/os.linux: supported
          operatorframework.io/arch.amd64: supported
          operatorframework.io/arch.s390x: supported
      spec:
        apiservicedefinitions: {}
        customresourcedefinitions:
          owned:
          - description: simpleTemplate_description
            displayName: zos-middleware-D
            kind: Zosmiddlewared
            name: zos-middleware-ds.templates.zoscb.ibm.com
            specDescriptors:
            - path: key1
              displayName: key1-label
            - path: key2
              displayName: key2-label
            statusDescriptors:
              - description: Dashboard URL
                displayName: Dashboard URL
                path: dashboard_url
                x-descriptors:
                  - urn:alm:descriptor:org.w3:link
              - description: Instance Binding Secret
                displayName: Binding Secret
                path: binding_secret
                x-descriptors:
                  - urn:alm:descriptor:io.kubernetes:Secret
            version: v1alpha1
          description: simpleTemplate_description
          displayName: zos-middleware-D
```

```
install:
  spec:
    deployments:
    - name: zos-middleware-d-operator
      spec:
        replicas: 1
        selector:
          matchLabels:
            name: zos-middleware-d-operator
        strategy: {}
        template:
          metadata:
            labels:
              zoscb-instance: zoscb1
              name: zos-middleware-d-operator
          spec:
            hostNetwork: false
            hostPID: false
            hostIPC: false
            securityContext:
              runAsNonRoot: true
            containers:
            - env:
              - name: WATCH_NAMESPACE
                valueFrom:
                  fieldRef:
                    fieldPath: metadata.annotations['olm.targetNamespaces']
              - name: POD_NAME
                valueFrom:
                  fieldRef:
                    fieldPath: metadata.name
              - name: OPERATOR_NAME
                value: zos-middleware-d-operator
              - name: ANSIBLE_GATHERING
                value: explicit
              - name: CR_KIND
                value: Zosmiddlewared
              - name: CATALOG_NAME
                value: zoscb1
              - name: TEMPLATE_NAME
                value: simpleTemplate
              image: cp.icr.io/cp/zoscb/zoscb-operator@sha256:
                a4cd1183e87dd2026408a392c45b6816bcd5d822acd934d8ae9756914e02bb6e
              imagePullPolicy: Always
              name: operator
              securityContext:
                privileged: false
                allowPrivilegeEscalation: false
                runAsNonRoot: true
                capabilities:
                  drop:
                  - ALL
              resources: {}
              volumeMounts:
              - mountPath: /tmp/ansible-operator/runner
                name: runner
              - mountPath: /opt/ansible/watches.yaml
                name: watches
                subPath: watches
            imagePullSecrets:
            - name: ibm-entitlement-key
            serviceAccountName: zos-middleware-d-operator
            volumes:
            - emptyDir: {}
              name: runner
            - name: watches
              configMap:
                name: zos-middleware-d-1.3.1
```

FIG. 7 (cont.)

```
700
        permissions:
        - rules:
            - apiGroups:
                - ""
              resources:
                - pods
                - services
                - services/finalizers
                - endpoints
                - persistentvolumeclaims
                - events
                - configmaps
                - secrets
              verbs:
                - create
                - delete
                - get
                - list
                - patch
                - update
                - watch
            - apiGroups:
                - apps
              resources:
                - deployments
                - daemonsets
                - replicasets
                - statefulsets
              verbs:
                - create
                - delete
                - get
                - list
                - patch
                - update
                - watch
            - apiGroups:
                - monitoring.coreos.com
              resources:
                - servicemonitors
              verbs:
                - get
                - create
            - apiGroups:
                - apps
              resourceNames:
                - zos-middleware-d-operator
              resources:
                - deployments/finalizers
              verbs:
                - update
            - apiGroups:
                - templates.zoscb.ibm.com
              resources:
                - '*'
              verbs:
                - create
                - delete
                - get
                - list
                - patch
                - update
                - watch
```

```
        - apiGroups:
          - zoscb.ibm.com
          resources:
          - '*'
          verbs:
          - get
          - list
          - watch
        - apiGroups:
          - security.openshift.io
          resources:
          - securitycontextconstraints
          resourceNames:
          - restricted
          verbs:
          - use
        serviceAccountName: zos-middleware-d-operator
      strategy: deployment
    installModes:
    - supported: true
      type: OwnNamespace
    - supported: true
      type: SingleNamespace
    - supported: false
      type: MultiNamespace
    - supported: false
      type: AllNamespaces
    keywords:
    - zos
    - zosmf
    links:
    - name: Knowledge Center
      url: https://www.ibm.com/support/knowledgecenter/SS8QRN_1.3.x/kc_welcome_page.html
    maintainers:
    - email: zipfunc1@us.ibm.com
      name: IBM z/OS Cloud Broker Team
    maturity: alpha
    provider:
      name: IBM
    version: 1.3.1
  crd: |
    apiVersion: apiextensions.k8s.io/v1beta1
    kind: CustomResourceDefinition
    metadata:
        name: zos-middleware-ds.templates.zoscb.ibm.com
        template_type: standard
    spec:
      group: templates.zoscb.ibm.com
      names:
        kind: Zosmiddlewared
        listKind: ZosmiddlewaredList
        plural: zos-middleware-ds
        singular: zos-middleware-d
      scope: Namespaced
      subresources:
        status: {}
```

```
        - apiGroups:
          - zoscb.ibm.com
          resources:
          - '*'
          verbs:
          - get
          - list
          - watch
        - apiGroups:
          - security.openshift.io
          resources:
          - securitycontextconstraints
          resourceNames:
          - restricted
          verbs:
          - use
        serviceAccountName: zos-middleware-d-operator
      strategy: deployment
    installModes:
    - supported: true
      type: OwnNamespace
    - supported: true
      type: SingleNamespace
    - supported: false
      type: MultiNamespace
    - supported: false
      type: AllNamespaces
    keywords:
    - zos
    - zosmf
    links:
    - name: Knowledge Center
      url: https://www.ibm.com/support/knowledgecenter/SS8QRN_1.3.x/kc_welcome_page.html
    maintainers:
    - email: zipfunc1@us.ibm.com
      name: IBM z/OS Cloud Broker Team
    maturity: alpha
    provider:
      name: IBM
    version: 1.3.1
crd:
  apiVersion: apiextensions.k8s.io/v1beta1
  kind: CustomResourceDefinition
  metadata:
    name: zos-middleware-ds.templates.zoscb.ibm.com
    template_type: standard
  spec:
    group: templates.zoscb.ibm.com
    names:
      kind: Zosmiddlewared
      listKind: ZosmiddlewaredList
      plural: zos-middleware-ds
      singular: zos-middleware-d
    scope: Namespaced
    subresources:
      status: {}
```

```
          validation:
            openAPIV3Schema:
              properties:
                spec:
                  properties:
                    key1:
                      description: "ZOSCB"
                      type: string
                    key2:
                      description: "ZOSCB"
                      type: string
                  type: object
                status:
                  properties:
                    dashboard_url:
                      description: Instance Dashboard URL
                      type: string
                    binding_secret:
                      description: Instance Binding Secret
                      type: string
                  type: object
              type: object
          additionalPrinterColumns:
          - name: Catalog
            type: string
            description: The catalog where this instance is provisioned
            JSONPath: .metadata.labels.catalog
          - name: Host
            type: string
            description: The z/OSMF Host
            JSONPath: .metadata.annotations.zosmf_host
          - name: Port
            type: string
            description: The z/OSMF Port
            JSONPath: .metadata.annotations.zosmf_port
          - name: Age
            description: Creation date
            type: date
            JSONPath: .metadata.creationTimestamp
          - name: Phase
            description: Catalog phase
            type: string
            JSONPath: .status.phase
          - name: Status
            description: The status of the provisioned instance
            type: string
            JSONPath: .status.conditions[0].message
          versions:
          - name: v1alpha1
            served: true
            storage: true
```

```
packages:
  channels:
    - currentCSV: zos-middleware-d-operator.v1.3.1
      name: v1.3
    defaultChannel: v1.3
    packageName: zos-middleware-d-operator
watches:
  ---
  - version: v1alpha1
    group: templates.zoscb.ibm.com
    kind: Zosmiddlewared
    role: /opt/ansible/roles/zosmf/provision
    finalizer:
      name: deprovision.templates.zoscb.ibm.com
      role: /opt/ansible/roles/zosmf/deprovision
kind: ConfigMap
metadata:
  creationTimestamp: "2021-01-29T17:46:21Z"
  labels:
    catalog: zoscb1
    template_cr_kind: Zosmiddlewared
  name: zos-middleware-d-1.3.1
  namespace: cb-svt-test-rc2
  ownerReferences:
  - apiVersion: zoscb.ibm.com/v1alpha1
    kind: ZosmfCatalog
    name: zoscb1
    uid: 1a4cb164-2a43-4e8c-9de2-00b00e9fdd19
  resourceVersion: "10960071"
  selfLink: /api/v1/namespaces/cb-svt-test-rc2/configmaps/zos-middleware-d-1.3.1
  uid: 8dd9c2d0-88b6-4224-8a0c-4c03c972b8ec
```

FIG. 7 (cont.)

AUTONOMOUS KUBERNETES OPERATOR CREATION AND MANAGEMENT

BACKGROUND

Embodiments described herein generally relate to processing systems, and more specifically, to autonomous Kubernetes operator creation and management.

Containers provide an application layer approach to virtualization. A container packages together code and its dependencies, and the container can be run on a physical processing system. Multiple containers can be run on the same physical processing system. This approach uses less resources than a virtual machine approach to virtualization. Kubernetes is a container orchestration system that enables automating application deployment, scaling, and management of containers.

SUMMARY

Embodiments of the present invention are directed to autonomous Kubernetes operator creation and management.

A non-limiting example computer-implemented method includes dynamically generating a sub-operator bundle based on a template. The method further includes converting, by a processing device using a sub-operator registry server, the sub-operator bundle into a sub-operator. The method further includes providing, by the processing device using the sub-operator registry server, the sub-operator to a catalog.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts a screenshot of software services templates according to one or more embodiments described herein;

FIG. 5 depicts code for a ClusterServiceVersion auto generated from metadata and input variables in a z/OSMF cloud provisioning and management template (i.e., one of the software services template of FIG. 4) according to one or more embodiments described herein;

FIG. 7 depicts code for a ConfigMap according to one or more embodiments described herein;

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for autonomous Kubernetes operator creation and management. Kubernetes operators are a technique for packaging, deploying, and managing a Kubernetes application. The are many benefits of Kubernetes operators versus native Kubernetes deployments, as Kubernetes operators enables code to be written to automate a task beyond the basic automation features provided in Kubernetes. Users are now starting to see the benefits of Kubernetes operators to manage their workload, but they also see that this technology can be rather complex to implement. The techniques described herein provide users with a way to automatically create and manage Kubernetes operators built around the workloads they have today without the requirement of moving this workload to run natively on a cloud platform.

Figure 1:
FIG. 1 depicts a developer catalog according to one or more embodiments described herein.

The Kubernetes operator framework provides a high level of abstraction for automating complex tasks orchestrated using the Kubernetes control plane. For certain cloud providers, like the Red Hat OpenShift Container Platform, the usage of operators improves the user experience. When using a Kubernetes cluster provided, for example, by Red Hat OpenShift Container Platform, developers are provided with a developer catalog of resources that can be provisioned and managed through the Kubernetes cluster. FIG. 1 depicts an example developer catalog 100 according to one or more embodiments described herein. Traditionally, entries are created manually by developers and are added into this developer catalog via products that deliver operators that install into the platform. These new operators, once installed, are seen as additional entries in the developer catalog.

Applications often use confirmation information from configuration files, command line arguments, environmental variables, and the like. In OpenShift, for example, this configuration information is stored in a ConfigMap and is decoupled from image content in order to provide portability of containerized applications. A ConfigMap is an API object used to store non-confidential data in key-value pairs. The ConfigMap provides mechanisms to inject containers with configuration data while keeping containers agnostic of the OpenShift Container Platform. A ConfigMap can be used to store fine-grained information like individual properties or coarse-grained information like entire configuration files or JSON blobs. The key-value pairs of configuration data can be consumed in pods or used to store configuration data for system components such as controllers.

In some cases, such as managing services that reside outside of the Kubernetes cluster, the ability to dynamically add new entries to the developer catalog 100 is desired. The present techniques enable dynamic entry by providing techniques that can autonomously deliver, install, and manage additional operators into the Kubernetes cluster. These additional operators are referred to as dynamically created sub-operators and are the same as a traditionally manually created operator except regarding how they are created. A dynamically created sub-operator is considered a "sub-operator" because its lifecycle is managed by the main operator that creates it. Sub-operators created by a main operator can be visible as an additional option for self-service management with the developer catalog 100.

The present techniques are directed on the capabilities for dynamically generating Kubernetes operator metadata and subsequently generating a dynamically created sub-operator that is served by a sub-operator registry.

One or more embodiments described herein relates to enabling Kubernetes operators to manage workloads that are currently deployed on the IBM® z/OS® management facility (z/OSMF). Conventionally, a user manually generates a Kubernetes operator bundle, which the user uses to build a docker image that copies the files in the operator bundle into a bundle image. The present techniques automate this process. As a result, this approach reduces time and complexity, enables running in a non-Internet connected environment, and avoids a more complex docker-in-docker approach. One example process includes monitoring (e.g., using a script) a sub-operator registry looking for a resource (e.g., a ConfigMap) having specific metadata (e.g., a label). The metadata are then used to build the files in the operator bundle into a bundle format that is compatible with the operator registry.

One or more embodiments described herein relates to dynamically generated sub-operators. Conventionally, Kubernetes operators are created by developers and enable users to perform various tasks. The present techniques provide a developer-built operator, which then dynamically generates its own sub-operators based on the user's z/OSMF templates. That is, the dynamically generated sub-operators are based on a set of templates in an external service catalog in a user's z/OSMF could provisioning and management environment. One example process includes parsing a set of z/OSMF templates to extract metadata, dynamically building sub-operators for each parsed template using the metadata, and installing and managing the lifecycle of the dynamically generated sub-operators via Kubernetes.

The above-described aspects of the invention address the shortcomings of the prior art. For example, if a user is currently deploying a workload using automated strategies such as IBM® z/OSMF cloud provisioning and management, the present techniques enable these deployments to be managed by Kubernetes operators, in which these operators are generated automatically based on information provided from the current deployments via templates.

Operators are built around the following components: a cluster service version component, which contains the metadata of the operator; a custom resource definition, which defines a new Kubernetes resource created to manage a workload; and a custom controller, which contains logic to deploy and manage the workload. The present techniques retrieve information from current workloads to generate these components to automatically build and install these components as an operator running on a platform such as Red Hat's OpenShift container platform. Further, modifications or deletions of a z/OSMF cloud provisioning and management template can be automatically detected and the operator(s) built around these templates can be updated or deleted accordingly.

Consider the following example: In a conventional operator lifecycle process an user manually generates an operator bundle that includes a ClusterServiceVersion, CustomResourceDefinitions, and a Package.yaml file or Annotations.yaml (depending on the operator-sdk version). Once these files are generated, the user builds a docker image that copies these files into that image called the bundle image. This is the normal process, but when attempting to dynamically build sub-operators on the fly such as from the z/OS cloud broker operator container, this can be challenging. The first difficulty is having to modify the z/OS cloud broker operator to run docker-in-docker, which allows for a docker container to build other docker images. Second, even with the docker-in-docker approach, if the main operator detects a certain number (e.g., 20) published z/OSMF cloud provisioning and management templates, this would mean that the z/OS cloud broker operator is responsible for building and pushing docker images for each these bundles to create an equivalent number (e.g., 20) of sub-operators. This is very time consuming. Third, many users running any application on a hybrid cloud platform can be running in an environment that has no internet connectivity. Without that internet connectivity, this could restrict the z/OS cloud broker operator from pushing the appropriate docker images to an external docker registry and having the catalog registry retrieve those images. The present techniques provide technical solutions to one or more of these disadvantages of existing solutions by dynamically generating operator metadata and subsequently dynamically building a sub-operator that is served by a sub-operator registry. For example, the present techniques can use ConfigMaps (or other suitable resource) to store bundles rather than having each bundle stored in a docker image and then having a catalog registry consume these bundles via the ConfigMaps (or other suitable resource). This enables docker-in-docker images to be bypassed to build individual bundle images and to drastically improve performance since the docker build process can also be bypassed.

Figure 2:
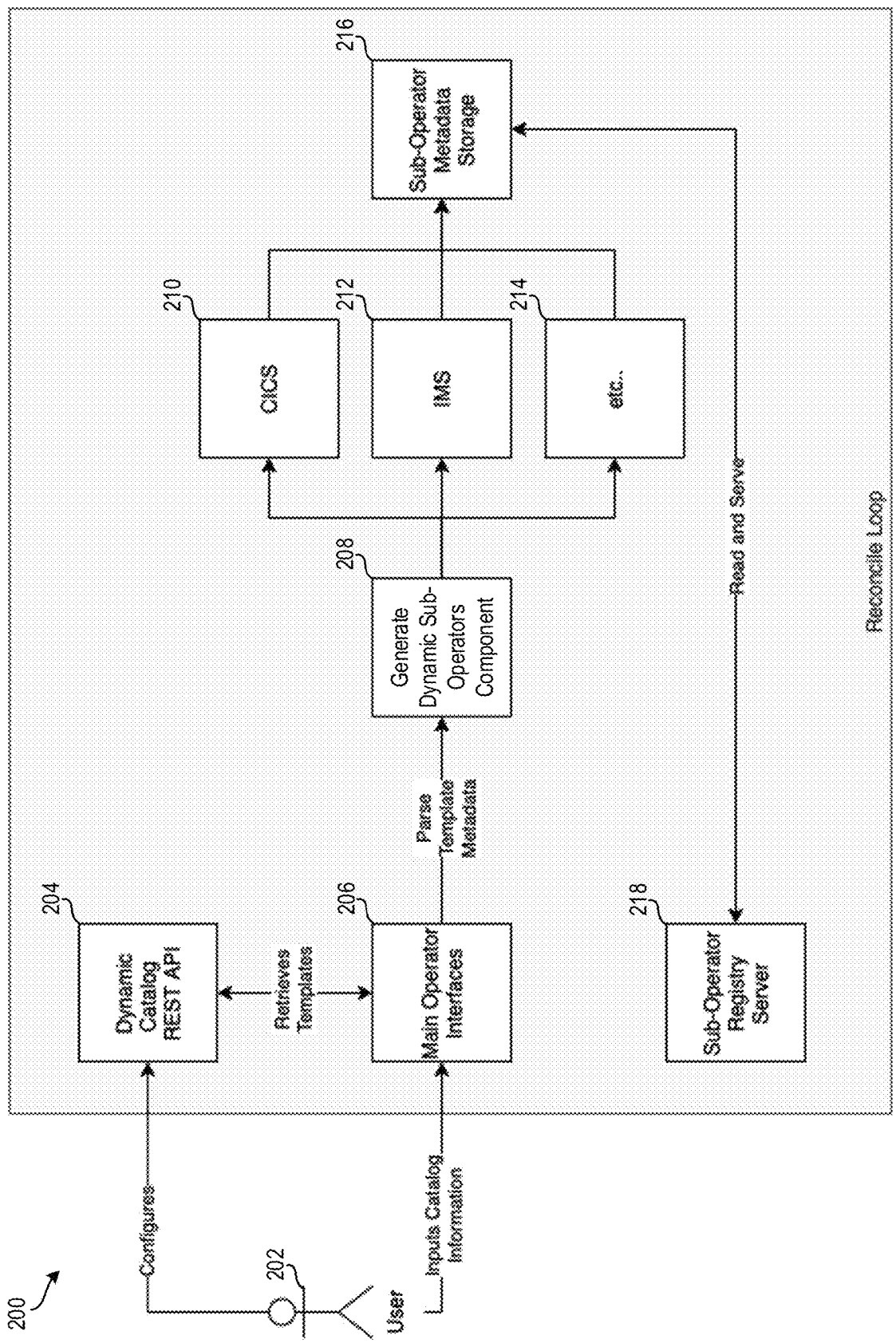
FIG. 2 depicts a system for autonomous Kubernetes operator creation and management according to one or more embodiments described herein.

Turning now to FIG. 2, a system 200 for autonomous Kubernetes operator creation and management is depicted in accordance with one or more embodiments of the present invention. In this example, a user 202 configures templates (i.e., a software services template (see, e.g., FIG. 4)) using dynamic catalog representational state transfer (REST) application programming interface (API) 204 and inputs catalog information via main operator interfaces 206. The main operator interfaces 206 parses template metadata from the templates and passes the metadata to the generate dynamic sub-operators component, which dynamically generates sub-operators 208. The dynamically generated sub-operators deploy various middleware instances such as customer information control system (CICS) 210, information management system (IMS) 212, etc. 214 (e.g., DB2). Metadata about the dynamically generated sub-operators is stored in a sub-operator metadata storage 216. A sub-operator registry server 218 monitors the sub-operator metadata storage 216 to detect changes to the metadata, in which case templates can be updated, new dynamically created operators can be created, etc. These and other features and functions of the system 200 are described further herein.

The various components, modules, engines, etc. described regarding FIG. 2 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include a processing device (e.g., one or more of the processors 1221 of FIG. 12) for executing those instructions. Thus a system memory (e.g., the random access memory (RAM) 1224 of FIG. 12) can store program instructions that when executed by the processing device implement the components, modules, engines, etc. described herein. Other components, modules, engines, etc. can also be utilized to include other features and functionality described in other examples herein.

With continued reference to FIG. 2, the sub-operator registry server 218 can implement a ConfigMap approach described herein and thus can operate as a "ConfigMap Server" (but is not so limited).

The ConfigMap Server (which is part of an operator software developer kit (SDK)) retrieves a ConfigMap stored in the sub-operator metadata storage 216. Conventionally, ConfigMaps are limited to 1 MB in size, which could easily be exceeded depending on the number of bundles to be stored based on published Z/OSMF templates. The techniques herein address this by enabling each bundle to be stored in an individual ConfigMap. This allows for a virtually unlimited number of bundles to be produced with limits based only on resource limitations of an OpenShift cluster.

Further, the ConfigMap server conventionally retrieves the ConfigMap on start up. This restricts the ability to make dynamic updates to an operator by updating the ConfigMap. The present techniques address this by allowing for modification/deletion of a z/OSMF template, which can enable immediate update of the ConfigMap bundle built from that template. In the sub-operator registry server 218, Kubernetes client watch feature is used to enable watching for changes in a ConfigMap or watch for the creation of a new ConfigMap. Once these changes/additions are detected, the server can be automatically restarted so that the deployed operator(s) can identify and implement these changes or so that a new dynamically generated sub-operator can be deployed.

Further, the main operator interfaces 206 can include a custom resource (e.g., a ZosmfCatalog) in the z/OS cloud broker operator. This operator also stores templates (e.g., Jinja templates) with the format of how to generate the files in the operator bundle in a consistent manner. The custom resource (e.g., the ZosmfCatalog) connects to a user's specified z/OSMF end point and retrieves a list of the published templates in z/OSMF cloud provisioning and management. From each z/OSMF cloud provisioning and management template, the present techniques can retrieve the information used to complete an operator bundle template and store these as ConfigMaps. After the ConfigMaps are generated, the sub-operator registry server 218 can then retrieve these ConfigMaps as described herein. The ZosmfCatlog also has a reconciliation period (e.g., 3 minutes) where it is able to poll z/OSMF (e.g., one time every reconciliation period) to watch for changes in the z/OSMF templates and update the ConfigMaps accordingly.

FIGS. 3-8 depict screenshots and code for implementing the techniques described herein. These figures are described with reference to FIG. 2, and reference is made to the z/OSMF cloud provisioning and management platform for exemplary purposes. It should be appreciated that the techniques described herein are not so limited and can be expanded to other environments/deployments.

Figure 3:
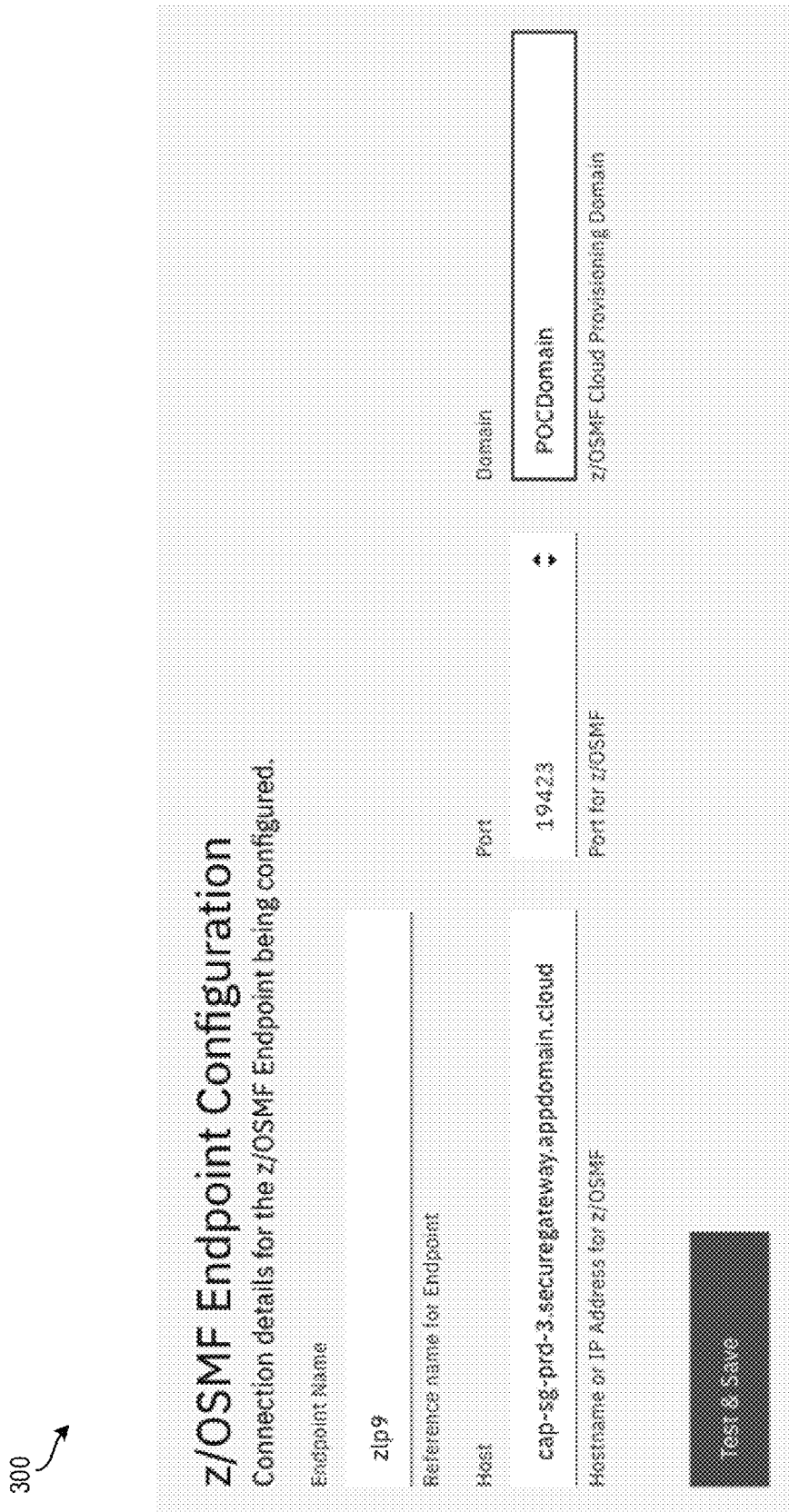
FIG. 3 depicts a screenshot of a z/OSMF endpoint configuration according to one or more embodiments described herein.

FIG. 3 depicts a screenshot 300 of a z/OSMF endpoint configuration according to one or more embodiments described herein. At this screen, which can be part of the main operator interfaces 206, the user 202 provides information to connect to the customer's z/OSMF cloud provisioning and management instance. For example, the user 202 can defined an endpoint name, a hostname or IP address, a port number, and/or a domain name. That is, this information can be used to retrieve templates from any source, such as the Dynamic Catalog REST API 204.

The z/OS Cloud Broker operator then retrieves a list of the published templates that are configured to deploy various middleware instances, such as CICS and DB2. For example, FIG. 4 depicts a screenshot 400 of software services templates according to one or more embodiments described herein. As can be seen, each template is identified by a template name and has an associated version and state (e.g., archived, draft, published).

Figure 6:
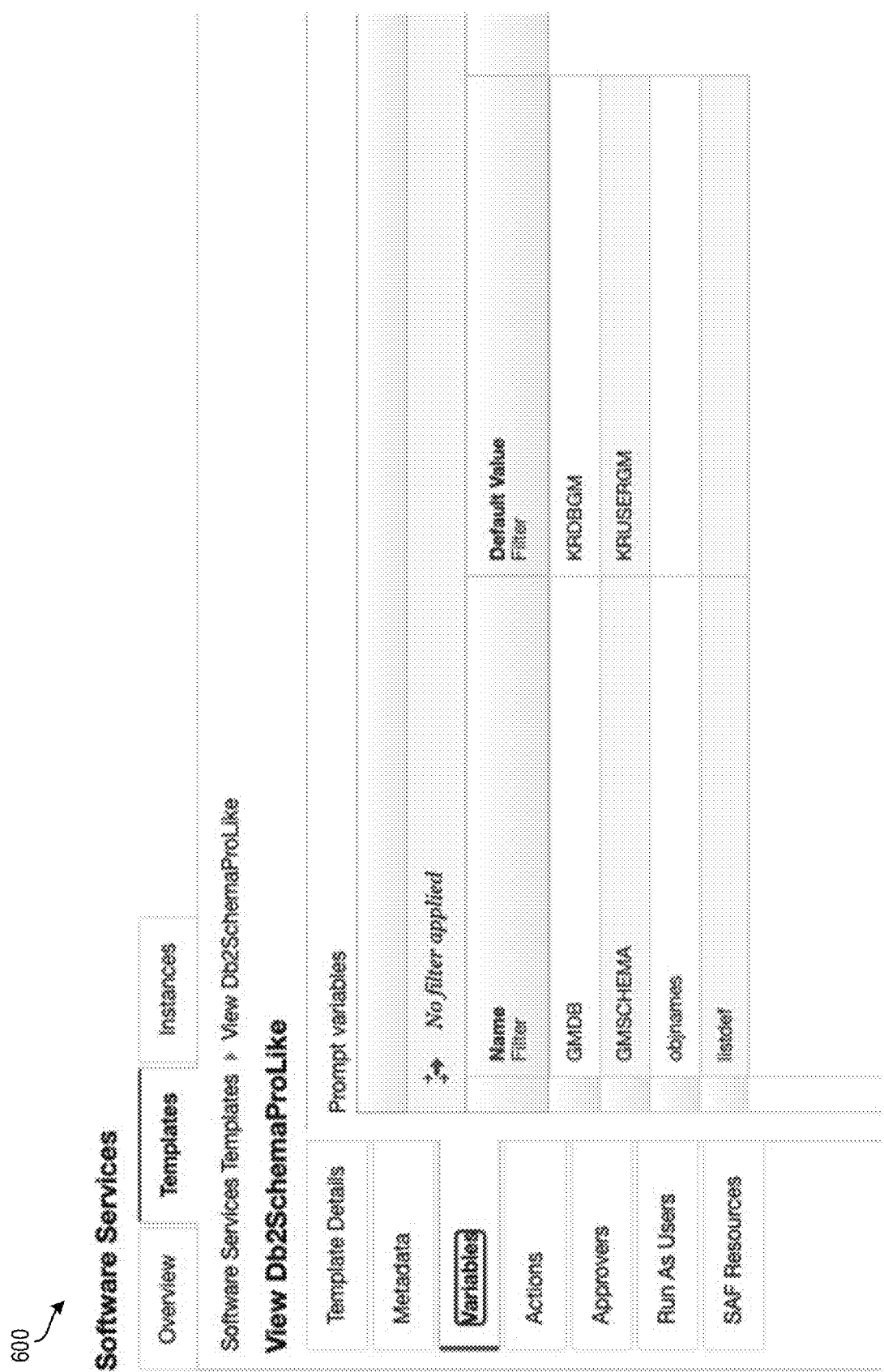
FIG. 6 depicts a screen shot of input variables for a DB2 template according to one or more embodiments described herein.

Metadata are then retrieved from each template to build the ClusterServiceVersion and the CustomResourceDefinition as described herein. This metadata can include, for example, the name and description of the template. Variables associated with the metadata are also retrieved to be converted as input parameters to the dynamically generated sub-operators. FIG. 5 depicts code 500 for a ClusterServiceVersion auto generated from metadata and input variables in a z/OSMF cloud provisioning and management template according to one or more embodiments described herein. FIG. 6 depicts a screen shot 600 of input variables for a DB2 template according to one or more embodiments described herein. As shown in this example, the template can include template details, metadata, variables, actions, approvers, run as users, resources, etc. The variables can be defined by name and can have a default value associated therewith.

A controller can then be built to be used for each operator that calls the z/OSMF API's to execute the actions of the template. The operator bundle including the ClusterServiceVersion, CustomerResourceDefinition, and Package.yaml file are stored as a ConfigMap. A custom sub-operator registry server pod can then be deployed in the customer's OpenShift environment that detects these ConfigMaps, retrieves the files stored in each ConfigMap, builds an individual operator for each bundle, and displays it in the OperatorHub catalog (see, e.g., FIG. 1). If a z/OSMF cloud provisioning and management template is modified, this can be detected during sub-operator reconciliation. In such cases, the ConfigMap update is then detected by the sub-operator registry server 218. The server 218 can pull in the change, recycle the server, and update the operator with these changes.

FIG. 7 depicts code 700 for a ConfigMap according to one or more embodiments described herein. As can be seen, the code 700 includes blocks for the metadata resources that are used by our the sub-operator registry server 218.

Figure 8:
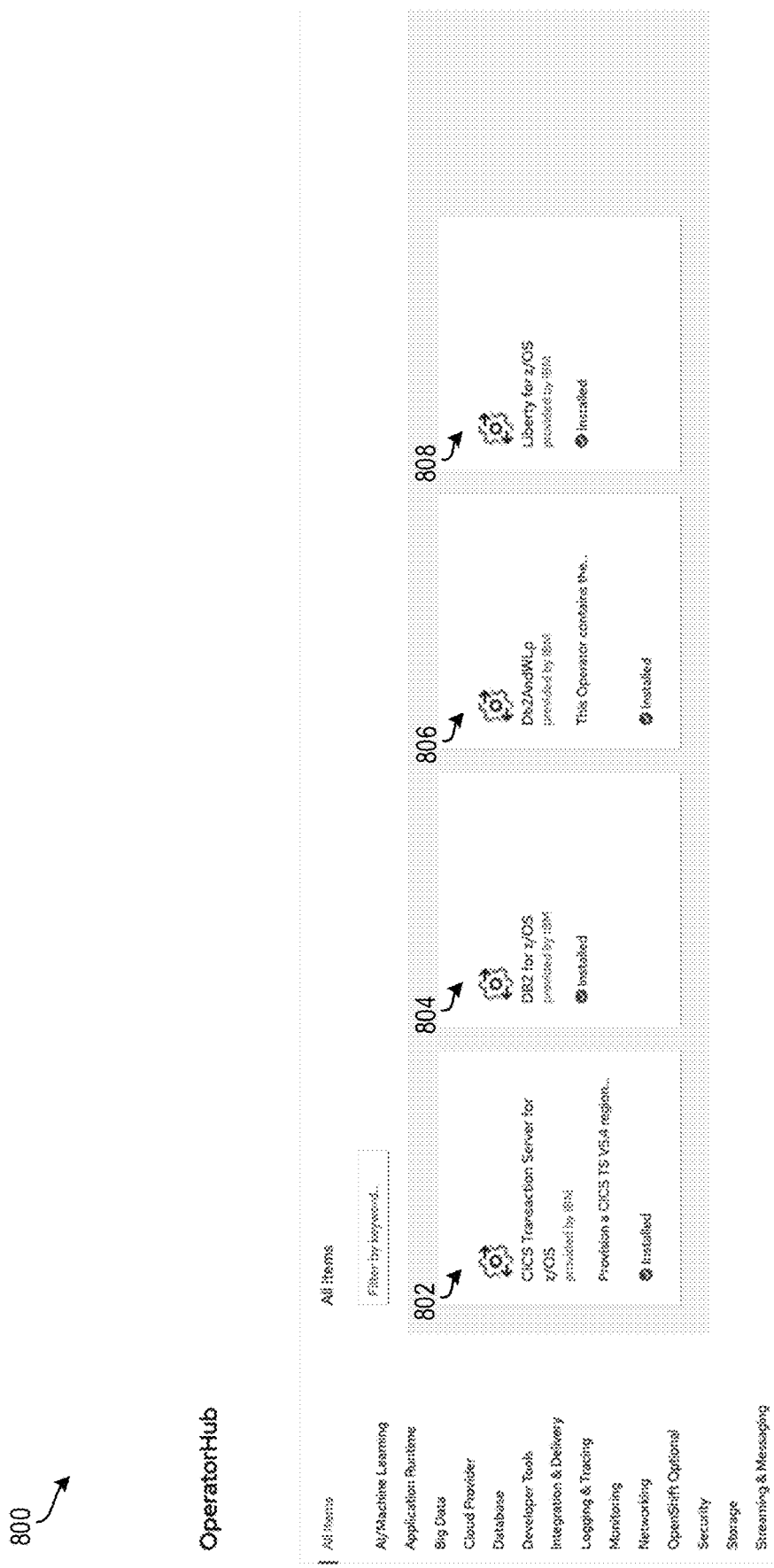
FIG. 8 depicts a screenshot of an OperatorHub catalog and ConfigMap bundles that are parsed via the sub-operator registry server according to one or more embodiments described herein.

FIG. 8 depicts a screenshot 800 of an operator hub catalog and ConfigMap bundles that are parsed via the sub-operator registry server 218 according to one or more embodiments described herein. As can be seen, multiple dynamically generated sub-operators 802, 804, 806, 808 are depicted. If a z/OSMF cloud provisioning and management template is deleted, it would be detected during the operator reconciliation and the ConfigMap is deleted. This would then be detected by the sub-operator registry server 218, in which the server 218 would delete this operator from the operator hub catalog.

Figure 9:
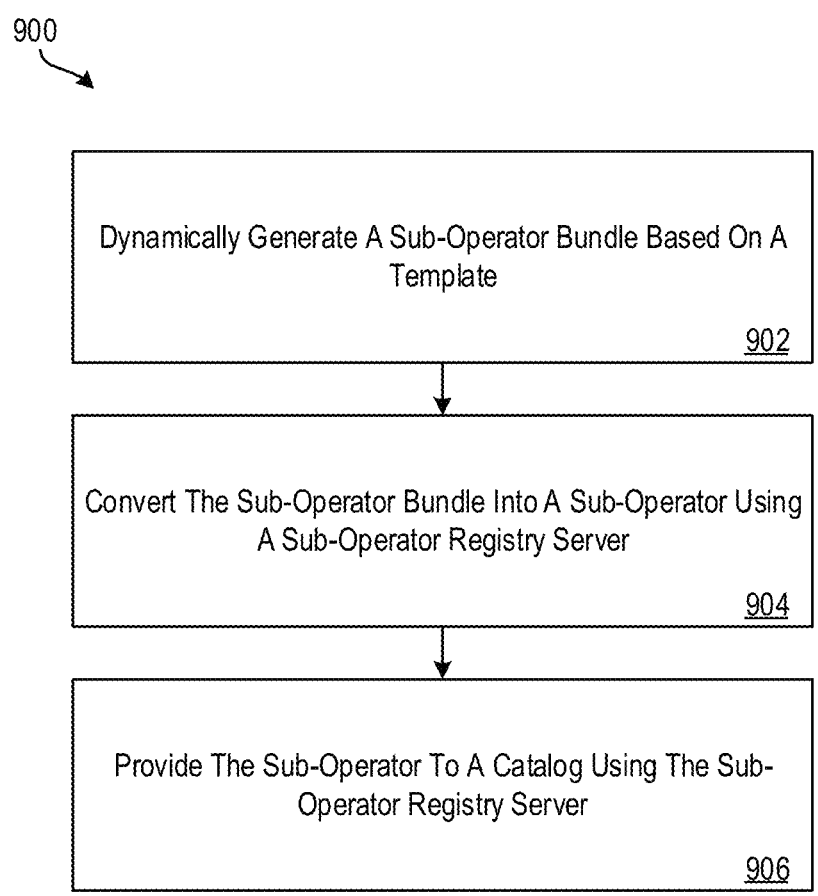
FIG. 9 depicts a flow diagram of a method for generating Kubernetes operator metadata and dynamically building a sub-operator based on a set of published templates according to examples of the present disclosure.

FIG. 9 depicts a flow diagram of a method 900 for generating Kubernetes operator metadata and dynamically building a sub-operator based on a set of published templates according to examples of the present disclosure. The method 900 can be performed by any suitable system, such as the system 200 of FIG. 2, the processing system 1200 of FIG. 12, and/or any other suitable system or device (e.g., a processing device).

At block 902, a sub-operator bundle is dynamically generated based on a template (e.g., a z/OSMF template defined by a user). At block 904, the sub-operator bundle is converted into a sub-operator using the sub-operator registry server (e.g., the sub-operator registry server 218). At block 906, the sub-operator is provided to a catalog (e.g., the) using the sub-operator registry server.

According to an example, the sub-operator bundle includes a ClusterServiceVersion, a CustomResourceDefinitions, and Package/Annotations file, which can be a .yaml file. In some examples, dynamically generating the sub-operator bundle includes monitoring, using a script, the sub-operator registry server to identify a resource having specific metadata and building, using the specific metadata, files into the sub-operator bundle. The resource and specific metadata can be, for example, a ConfigMap and a label respectively, although other resources and metadata can be used.

In some examples an operator bundle is a first-level Kubernetes operator, and the sub-operator is a second-level Kubernetes operator. The first-level Kubernetes operator and the second-level Kubernetes operator can be displayed in the operator hub catalog as described herein.

Additional processes also may be included. For example, the method 900 can include parsing a set of templates to extract the metadata, building (using the metadata) a sub-operator for each parsed template of the set of templates, and installing and managing a lifecycle of each of the dynamically built sub-operators via Kubernetes. In another example, the method 900 can include detecting a modification to the template, and responsive to detecting the modification, updating a corresponding ConfigMap associated with the template. In another example, the method 900 can include detecting a deletion of the template, and responsive to detecting the deletion, updating a corresponding ConfigMap associated with the template.

It should be understood that the process depicted in FIG. 9 represents an illustration, and that other processes may be added or existing processes may be removed, modified, or rearranged without departing from the scope of the present disclosure.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
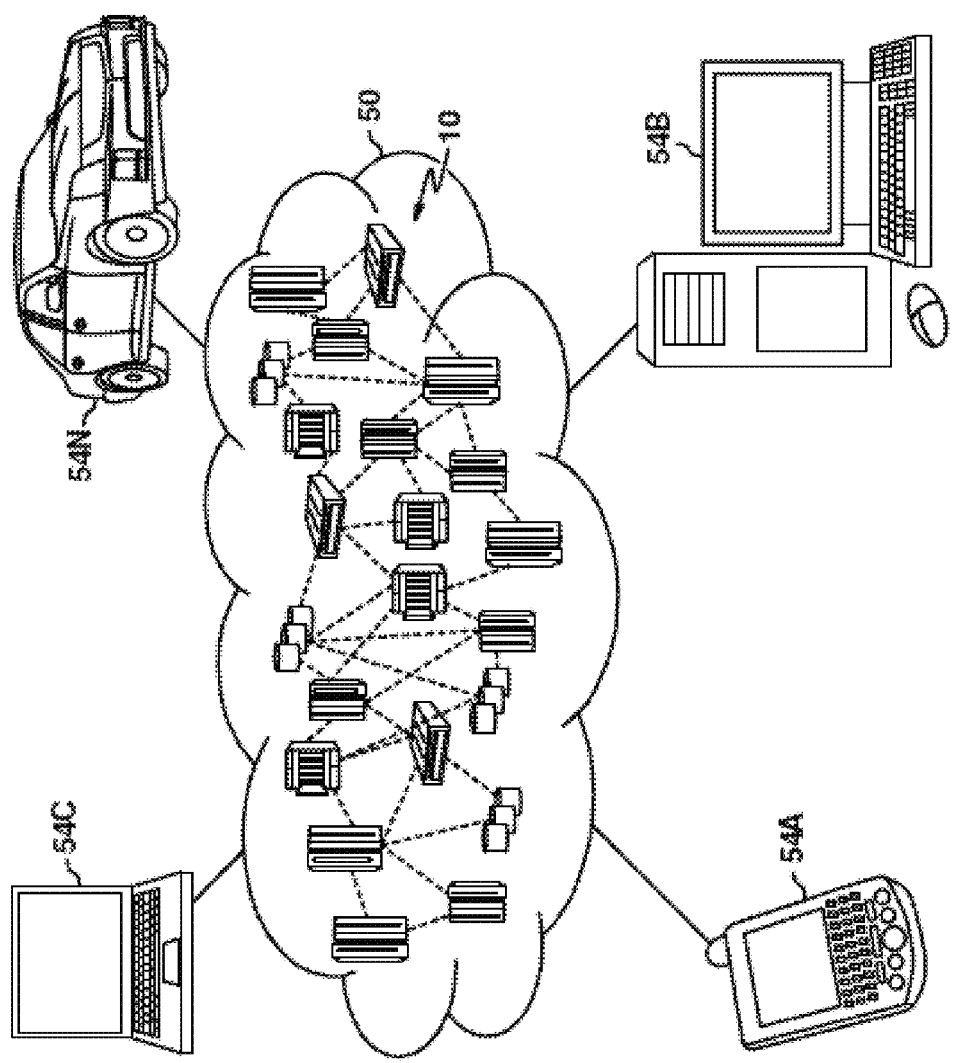
FIG. 10 depicts a cloud computing environment according to one or more embodiments described herein.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
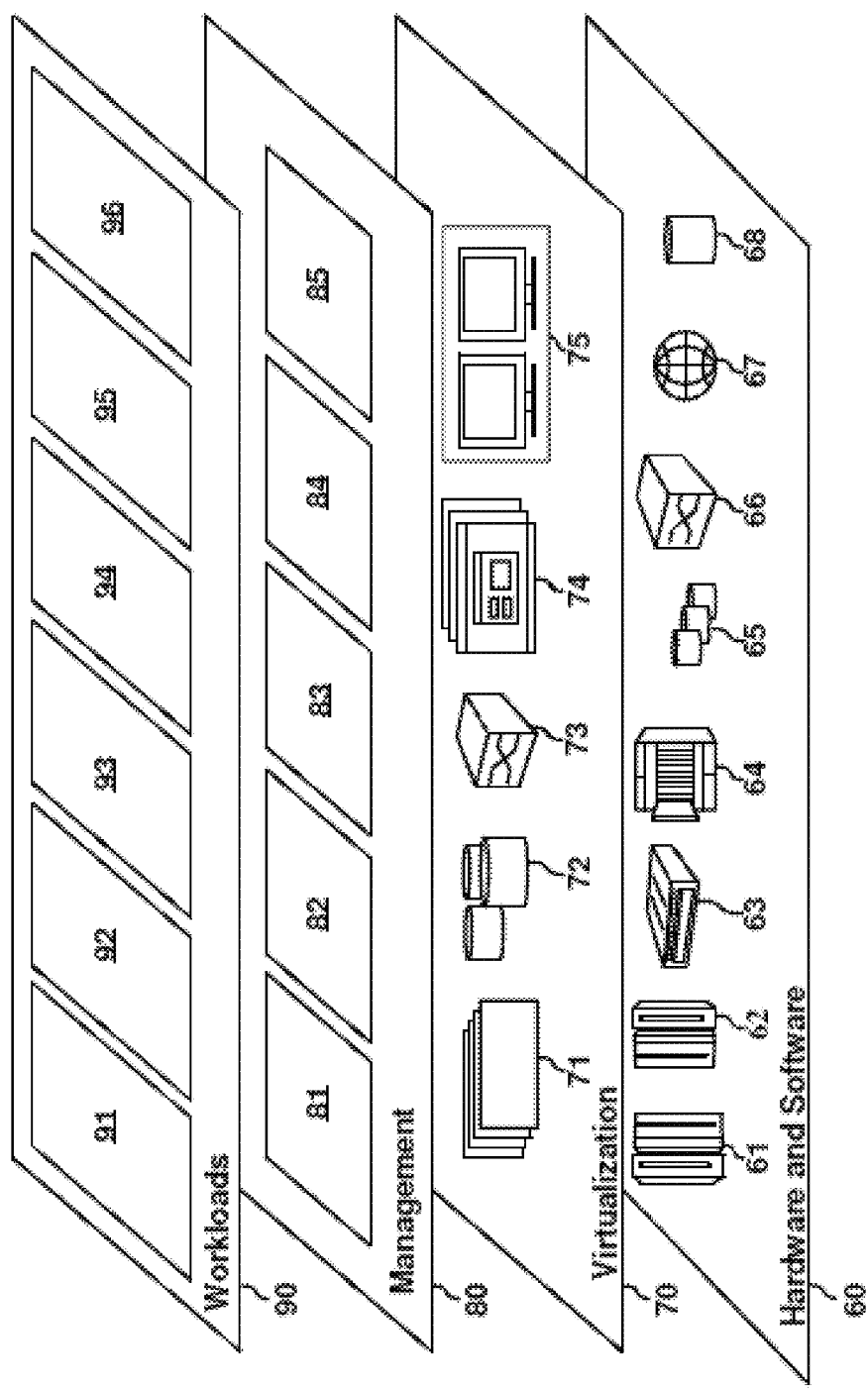
FIG. 11 depicts abstraction model layers according to one or more embodiments described herein.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and generating Kubernetes operator metadata and dynamically building a sub-operator based on a set of published templates 96.

Figure 12:
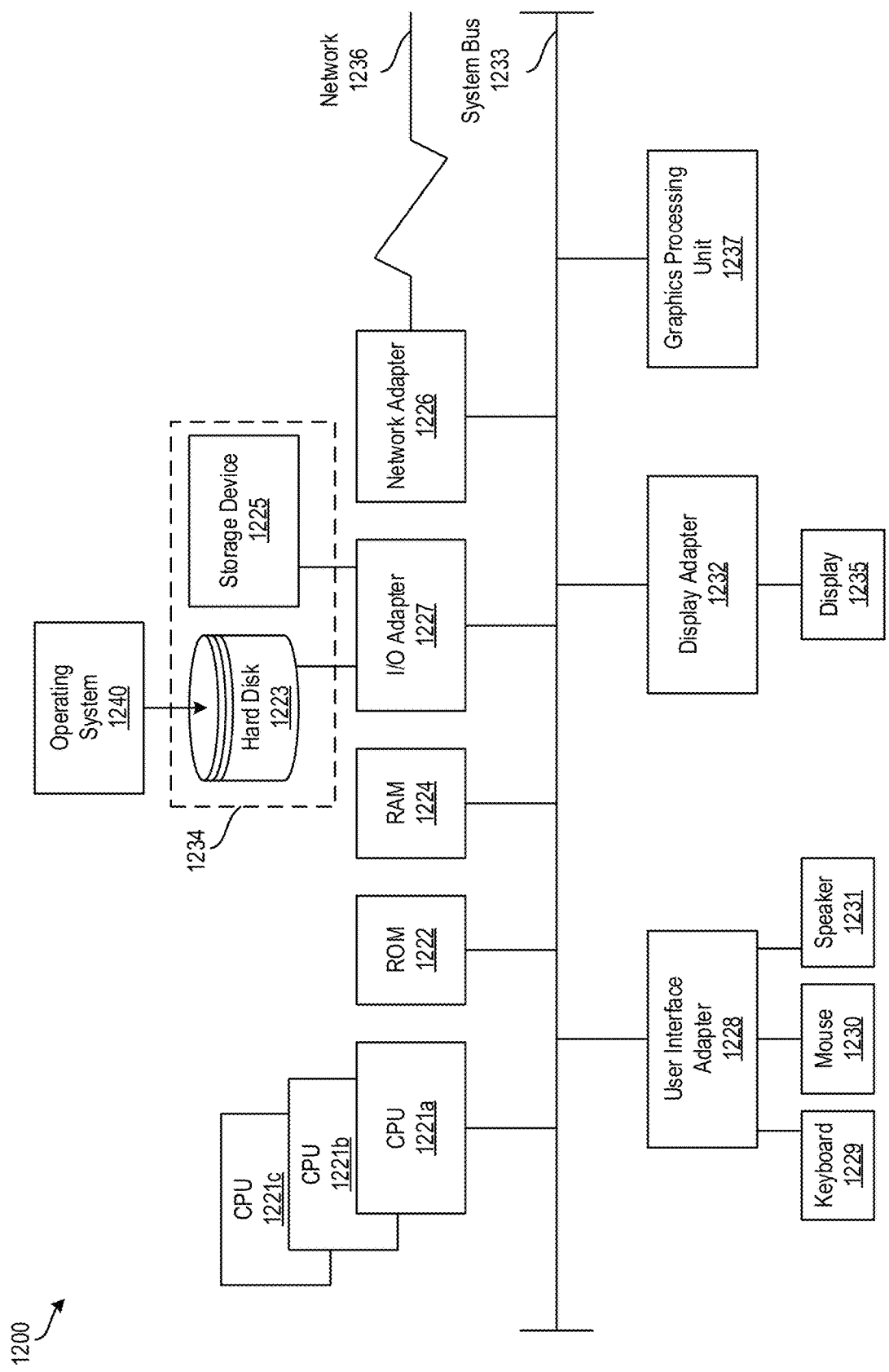
FIG. 12 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 12 depicts a block diagram of a processing system 1200 for implementing the techniques described herein. In accordance with one or more embodiments described herein, the processing system 1200 is an example of a cloud computing node 10 of FIG. 10. In examples, processing system 1200 has one or more central processing units ("processors" or "processing resources") 1221a, 1221b, 1221c, etc. (collectively or generically referred to as processor(s) 1221 and/or as processing device (s)). In aspects of the present disclosure, each processor 1221 can include a reduced instruction set computer (RISC) microprocessor. Processors 1221 are coupled to system memory (e.g., random access memory (RAM) 1224) and various other components via a system bus 1233. Read only memory (ROM) 1222 is coupled to system bus 1233 and may include a basic input/output system (BIOS), which controls certain basic functions of processing system 1200.

Further depicted are an input/output (I/O) adapter 1227 and a network adapter 1226 coupled to system bus 1233. I/O adapter 1227 may be a small computer system interface (SCSI) adapter that communicates with a hard disk 1223 and/or a storage device 1225 or any other similar component. I/O adapter 1227, hard disk 1223, and storage device 1225 are collectively referred to herein as mass storage 1234. Operating system 1240 for execution on processing system 1200 may be stored in mass storage 1234. The network adapter 1226 interconnects system bus 1233 with an outside network 1236 enabling processing system 1200 to communicate with other such systems.

A display (e.g., a display monitor) 1235 is connected to system bus 1233 by display adapter 1232, which may include a graphics adapter to improve the performance of graphics intensive applications and a video controller. In one aspect of the present disclosure, adapters 1226, 1227, and/or 1232 may be connected to one or more I/O busses that are connected to system bus 1233 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 1233 via user interface adapter 1228 and display adapter 1232. A keyboard 1229, mouse 1230, and speaker 1231 may be interconnected to system bus 1233 via user interface adapter 1228, which may include, for example, a Super I/O chip integrating multiple device adapters into a single integrated circuit.

In some aspects of the present disclosure, processing system 1200 includes a graphics processing unit 1237. Graphics processing unit 1237 is a specialized electronic circuit designed to manipulate and alter memory to accelerate the creation of images in a frame buffer intended for output to a display. In general, graphics processing unit 1237 is very efficient at manipulating computer graphics and image processing, and has a highly parallel structure that makes it more effective than general-purpose CPUs for algorithms where processing of large blocks of data is done in parallel.

Thus, as configured herein, processing system 1200 includes processing capability in the form of processors 1221, storage capability including system memory (e.g., RAM 1224), and mass storage 1234, input means such as keyboard 1229 and mouse 1230, and output capability including speaker 1231 and display 1235. In some aspects of the present disclosure, a portion of system memory (e.g., RAM 1224) and mass storage 1234 collectively store the operating system 1240 such as the AIX® operating system from IBM Corporation to coordinate the functions of the various components shown in processing system 1200.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
dynamically generating a sub-operator bundle based on a template;
converting, by a processing device using a sub-operator registry server, the sub-operator bundle into a sub-operator; and
providing, by the processing device using the sub-operator registry server, the sub-operator to a catalog;
wherein dynamically generating the sub-operator bundle comprises:
monitoring, using a script, the sub-operator registry server to identify a resource having specific metadata used for building the sub-operator bundle for a cloud computing environment; and
building, using the specific metadata, files into the sub-operator bundle for the cloud computing environment, the sub-operator bundle being built while bypassing docker-in-docker images;
parsing a set of templates to extract the metadata;
building, using the metadata, a sub-operator for each parsed template of the set of templates; and
installing and managing a lifecycle of each of the dynamically built sub-operators via Kubernetes.

2. The computer-implemented method of claim 1, wherein the resource is a Config Map, and wherein the specific metadata is a label.

3. The computer-implemented method of claim 1, wherein the sub-operator bundle comprises a ClusterServiceVersion, CustomResourceDefinitions and Package/Annotations file.

4. The computer-implemented method of claim 1, further comprising:
detecting a modification to the template; and
responsive to detecting the modification, updating a corresponding ConfigMap associated with the template.

5. The computer-implemented method of claim 1, further comprising:
   detecting a deletion of the template; and
   responsive to detecting the deletion, updating a corresponding ConfigMap associated with the template.

6. The computer-implemented method of claim 1, wherein the template is defined by a user.

7. The computer-implemented method of claim 1, wherein an operator bundle is a first-level Kubernetes operator, and wherein the dynamically generated sub-operator is a second-level Kubernetes operator.

8. The computer-implemented method of claim 7, wherein the first-level Kubernetes operator and the second-level Kubernetes operator are displayed in a system operator hub catalog.

9. The computer-implemented method of claim 1, wherein the sub-operator bundle is deployed in a cloud computing environment.

10. A system comprising:
   a memory comprising computer readable instructions; and
   a processing device for executing the computer readable instructions, the computer readable instructions controlling the processing device to perform operations comprising:
   dynamically generating a sub-operator bundle based on a template; converting, by the processing device using a sub-operator registry server, the sub-operator bundle into a sub-operator; and providing, by the processing device using the sub-operator registry server, the sub-operator to a catalog:
   wherein dynamically generating the sub-operator bundle comprises:
   monitoring, using a script, the sub-operator registry server to identify a resource having specific metadata used for building the sub-operator bundle for a cloud computing environment; and
   building, using the specific metadata, files into the sub-operator bundle for the cloud computing environment, the sub-operator bundle being built while bypassing docker-in-docker images;
   parsing a set of templates to extract the metadata;
   building, using the metadata, a sub-operator for each parsed template of the set of templates; and
   installing and managing a lifecycle of each of the dynamically built sub-operators via Kubernetes.

11. The system of claim 10, wherein dynamically generating the sub-operator bundle comprises:
   monitoring, using a script, the sub-operator registry server to identify a resource having specific metadata; and
   building, using the specific metadata, files into the sub-operator bundle.

12. The system of claim 10, wherein the processing device is further configured to perform operations comprising:
   detecting a modification to the template; and
   responsive to detecting the modification, updating a corresponding ConfigMap associated with the template.

13. The system of claim 10, wherein the processing device is further configured to perform operations comprising:
   detecting a deletion of the template; and
   responsive to detecting the deletion, updating a corresponding ConfigMap associated with the template.

14. The system of claim 10, wherein an operator bundle is a first-level Kubernetes operator, and wherein the dynamically generated sub-operator is a second-level Kubernetes operator.

15. The system of claim 14, wherein the first-level Kubernetes operator and the second-level Kubernetes operator are displayed in a system operator hub catalog.

16. The system of claim 10, wherein the sub-operator bundle is deployed in a cloud computing environment.

17. A computer program product comprising a computer readable storage medium having program instructions embodied therewith, the program instructions executable by a processor to cause the processor to perform operations comprising:
   dynamically generating a sub-operator bundle based on a template;
   converting, by the processing device using a sub-operator registry server, the sub-operator bundle into a sub-operator; and
   providing, by the processing device using the sub-operator registry server, the sub-operator to a catalog;
   wherein dynamically generating the sub-operator bundle comprises:
   monitoring, using a script, the sub-operator registry server to identify a resource having specific metadata used for building the sub-operator bundle for a cloud computing environment; and
   building, using the specific metadata, files into the sub-operator bundle for the cloud computing environment, the sub-operator bundle being built while bypassing docker-in-docker images;
   parsing a set of templates to extract the metadata;
   building, using the metadata, a sub-operator for each parsed template of the set of templates; and
   installing and managing a lifecycle of each of the dynamically built sub-operators via Kubernetes.

* * * * *